United States Patent
Bargheer et al.

(10) Patent No.: US 7,708,626 B2
(45) Date of Patent: May 4, 2010

(54) AIR SUPPLY DEVICE FOR AN AUTOMOTIVE SEAT

(75) Inventors: Claudio Bargheer, Holzgerlingen (DE); Dietmar Hartmann, Deckenpfronn (DE); Karl Pfahler, Stuttgart (DE); Lothar Renner, Nufringen (DE)

(73) Assignee: Daimler AG, Stuttgart (DE)

( * ) Notice: Subject to any disclaimer, the term of this patent is extended or adjusted under 35 U.S.C. 154(b) by 417 days.

(21) Appl. No.: 10/553,131

(22) PCT Filed: Feb. 26, 2004

(86) PCT No.: PCT/EP2004/001897
§ 371 (c)(1),
(2), (4) Date: Jun. 29, 2006

(87) PCT Pub. No.: WO2004/091966
PCT Pub. Date: Oct. 28, 2004

(65) Prior Publication Data
US 2006/0267383 A1 Nov. 30, 2006

(30) Foreign Application Priority Data
Apr. 16, 2003 (DE) ................. 103 17 512

(51) Int. Cl.
A47C 7/74 (2006.01)
A47C 31/00 (2006.01)
F25B 21/02 (2006.01)

(52) U.S. Cl. .................. 454/120; 297/217.1; 62/3.5
(58) Field of Classification Search ............ 454/364; 62/3.5, 3.61, 261
See application file for complete search history.

(56) References Cited

U.S. PATENT DOCUMENTS

| | | | | |
|---|---|---|---|---|
| 4,491,270 A | * | 1/1985 | Brand | ............... 236/49.5 |
| 4,572,430 A | | 2/1986 | Takagi et al. | |
| 5,002,336 A | | 3/1991 | Feher | |
| 5,102,189 A | | 4/1992 | Saito et al. | |
| 5,137,326 A | | 8/1992 | George | |

(Continued)

FOREIGN PATENT DOCUMENTS

| | | |
|---|---|---|
| DE | 1 123 220 | 8/1962 |
| DE | 34 23 657 A1 | 3/1985 |
| DE | 36 09 095 C2 | 10/1986 |
| DE | 87 00 003.2 U | 4/1987 |
| DE | 39 25 809 A1 | 2/1991 |

(Continued)

OTHER PUBLICATIONS

PCT/ISA/237 with English Translation of relevant portion (Eight (8) pages).

(Continued)

*Primary Examiner*—Steve McAllister
*Assistant Examiner*—Helena Kosanovic
(74) *Attorney, Agent, or Firm*—Crowell & Moring LLP

(57) ABSTRACT

An air supply device for an automotive seat includes an air duct which is arranged at the delivery side of a fan and has at least one air outlet opening provided in the upper region of the seat for supplying the head, shoulder and neck region of a seat occupant with a flow of air. A heating element is arranged in the air duct between the fan and the air outlet opening, and the air supply device has at least one sensor for detecting a parameter value as a function of which the flow of air emerging from the air outlet opening is controlled. In order to provide the air supply device with a flow of air which can be controlled in a more universal manner, the sensor is arranged inside the air duct between the air outlet opening and the heating element.

8 Claims, 3 Drawing Sheets

U.S. PATENT DOCUMENTS

| | | | |
|---|---|---|---|
| 5,524,439 A * | 6/1996 | Gallup et al. | 62/3.5 |
| 6,048,024 A * | 4/2000 | Wallman | 297/180.14 |
| 6,604,785 B2 | 8/2003 | Bargheer et al. | |
| 6,644,735 B2 | 11/2003 | Bargheer et al. | |
| 6,761,399 B2 | 7/2004 | Bargheer et al. | |
| 6,786,545 B2 * | 9/2004 | Bargheer et al. | 297/217.1 |
| 7,075,034 B2 | 7/2006 | Bargheer et al. | |

FOREIGN PATENT DOCUMENTS

| | | |
|---|---|---|
| DE | 196 54 370 C1 | 1/1998 |
| DE | 10054009 A1 | 5/2002 |
| EP | 1080956 A1 | 3/2001 |
| EP | 1190877 A2 | 3/2002 |
| JP | 54-99241 U | 7/1979 |
| JP | 56-14713 U | 2/1981 |
| JP | 61-145017 A | 7/1986 |
| JP | 61-253239 A | 11/1986 |
| JP | 1-99266 U | 7/1989 |
| JP | 3-64552 U | 6/1991 |
| JP | 7-266841 A | 10/1995 |
| JP | 10-297275 A | 11/1998 |
| JP | 2002-46455 A | 2/2002 |
| JP | 2002-187471 A | 7/2002 |
| WO | WO 00/63034 | 10/2000 |

OTHER PUBLICATIONS

Translator's English language abstract of JP 3-64552 U previously submitted on Jun. 27, 2008.
Mechanical English language abstract of JP 3-64552 U previously submitted on Jun. 27, 2008.
Translator's English language abstract of JP 1-99266 U previously submitted on Jun. 27, 2008.
Mechanical English language abstract of JP 1-99266 U previously submitted on Jun. 27, 2008.
Translator's English language abstract of JP 54-99241 previously submitted on Jun. 27, 2008.
Translator's English language abstract of JP 56-14713 U previously submitted on Jun. 27, 2008.
English language translation of DE 1 123 220 previously submitted on Jun. 27, 2008.
English language abstract of DE 36 09 095 previously submitted on Jun. 27, 2008.
English language translation of DE 87 00 003.2 U1 previously submitted on Jun. 27, 2008.
English language abstract of DE 39 25 809 A1 previously submitted on Jun. 27, 2008.
English language abstract of DE 34 23 657 A1 previously submitted on Jun. 27, 2008.

* cited by examiner

AIR SUPPLY DEVICE FOR AN AUTOMOTIVE SEAT

BACKGROUND AND SUMMARY OF THE INVENTION

This invention relates to an air supply device for an automotive seat.

In an air supply device of this type, already known from German document DE 100 54 009 A1, an air duct is arranged on the delivery side of a fan and has at least one air outlet opening provided in the upper region of the seat for supplying the head, shoulder and neck region of a seat occupant with a flow of air. The flow of air is heated here by arranging a heating element inside the air duct between the fan and the air outlet opening. The flow of air emerging from the air outlet opening can be controlled here by means of a sensor for detecting an external parameter value, for example the driving speed or the outside temperature.

It is the object of the invention to provide an air supply device of the initially mentioned type whose flow of air can be controlled in a more universal manner.

This object is achieved according to the invention by means of an air supply device having features as claimed. Advantageous embodiments together with expedient developments of the invention are defined in dependent claims.

In the air supply device according to the invention, at least one sensor, which can be used, for example, to detect the temperature and/or the quantity of the flow of air, is arranged inside the air duct between the air outlet opening and the heating element. If, for example, the temperature of the flow of air emerging from the air outlet opening in the direction of the seat occupant is too high, owing for example to too high an ambient temperature, the heating element and/or the fan are/is switched back or off. If the temperature falls below a predetermined temperature, the fan and the heating element can be switched on again or the air quantity or temperature can be increased again. The value supplied by the sensor additionally makes it possible to recognize if, for example, the air outlet opening is partially or completely concealed in an inadmissible manner and the temperature consequently exceeds an admissible upper limit. In this case, the heating element and/or the fan are/is likewise switched back or off.

Further advantages, features and details of the invention will become apparent from the following description of two preferred exemplary embodiments and also with reference to the drawings.

DETAILED DESCRIPTION OF THE INVENTION

Figures 1A, 1B:
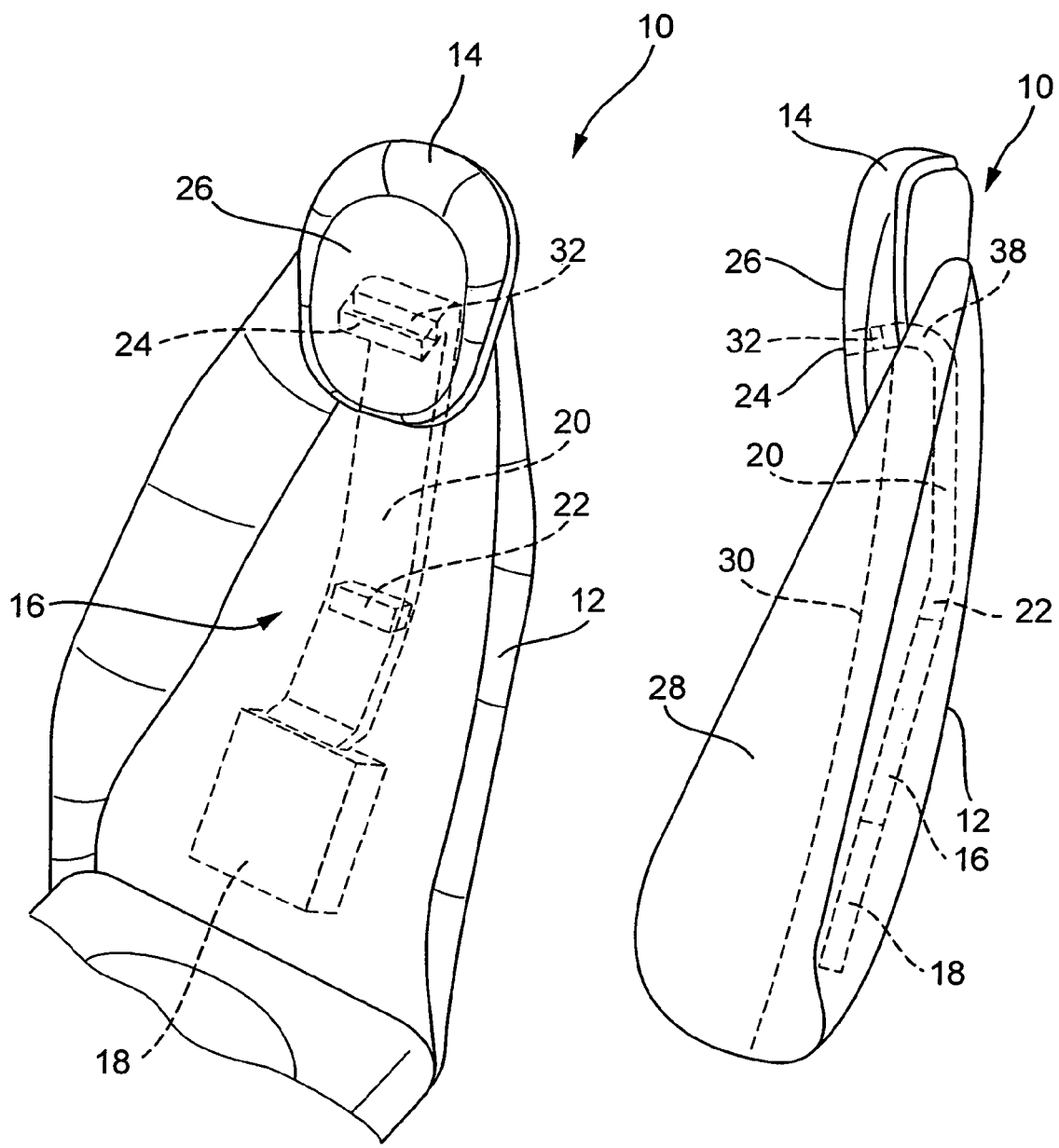
FIGS. 1a and 1b show a schematic, perspective front view and a schematic side view of the backrest of an automotive seat having the integrated air supply device according to the invention.

FIGS. 1a and 1b illustrate the backrest 10 of an automotive seat in a schematic perspective front view and in a schematic side view respectively. A rear covering piece 12 and a head restraint 14 is all that can be seen of the backrest 10 in FIG. 1a. The automotive seat here is designed as an integral seat, with the head restraint 14 overlapping and being arranged in front of the backrest 10. The head restraint 14 is height-adjustable with respect to the backrest 10 by way of guide means (not shown). An air supply device 16 is fastened to the rear covering piece 12 of the backrest 10, the key components of this device being a schematically illustrated fan 18 at the lower end of the air supply device and an air duct 20 arranged above the fan 18. Provided inside the air duct 20 at a distance above the fan 18, on the delivery side thereof, is a heating element 22 which can be used to heat the flow of air produced by the fan 18, this heating element 22 being illustrated only by broken lines in FIG. 1a. The vertically extending air duct 20 is bent forward into an L shape at the upper end and terminates in an air outlet opening 24. The air duct 20 here terminates, in the region of the air outlet opening 24, in a plane with the front side 26 of the head restraint 14. A grating element 32 is illustrated inside the air duct 20 close to the air outlet opening 24 and will be explained in more detail below with reference to FIGS. 3a and 3b and 4a and 4b. FIG. 1b additionally shows a lateral flank 28 of the backrest 10 and also, indicated by broken lines, the profile of the upholstery cover 30 in the central panel region of the backrest 10. It can also be seen from this figure that the air supply device 16 is completely arranged inside the backrest 10 and only the air outlet opening 24 is visible from outside. The sensor (which will be explained below) inside the air duct 20 is not represented in FIGS. 1a and 1b.

Figure 2:
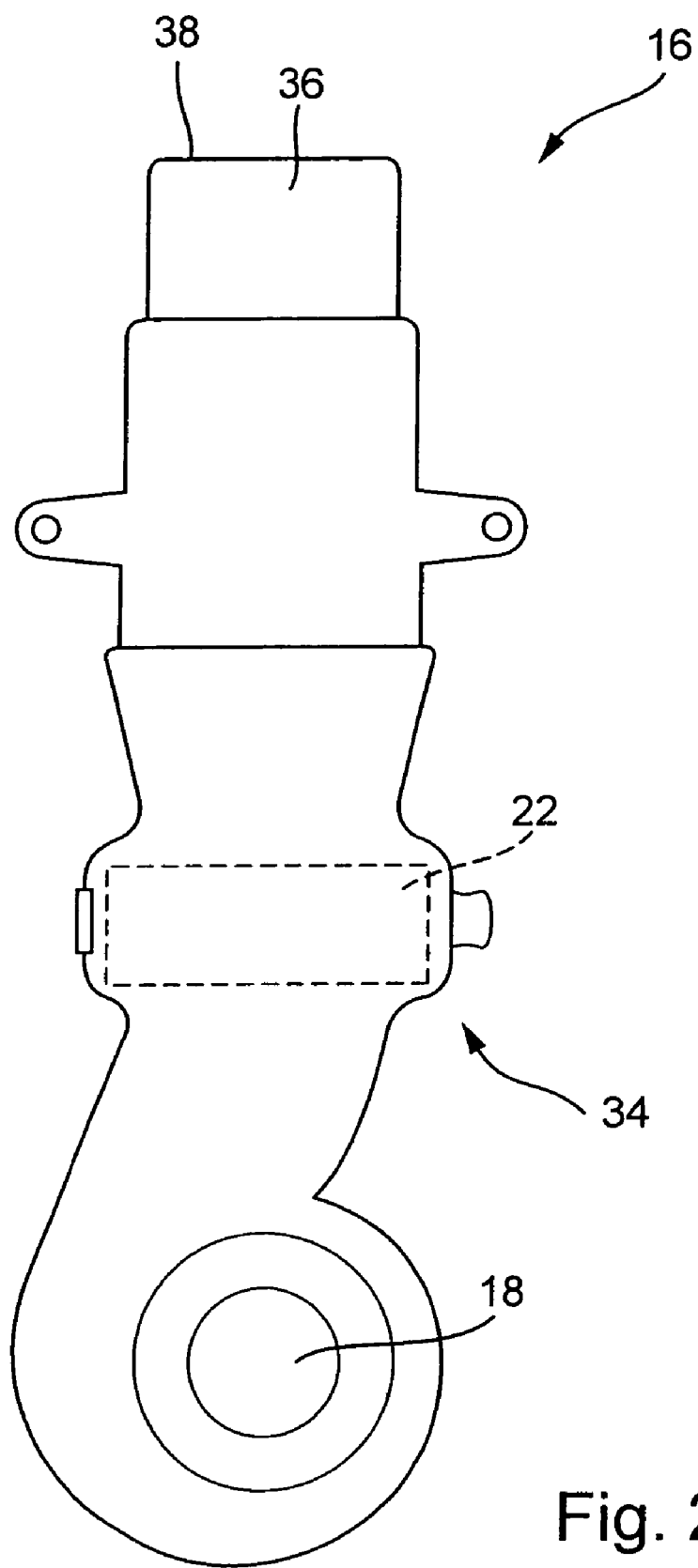
FIG. 2 shows a rear view of the air supply device according to FIGS. 1a and 1b in which it is possible to see a fan in the lower region and, above the fan, the air supply duct with the air outlet opening arranged at the upper end.

FIG. 2 represents the air supply device 16 according to FIGS. 1a and 1b in a rear view. In the present exemplary embodiment, the fan 18 which is visible at the lower end of the air supply device 16 has a non-visible inlet opening which is arranged at the front side of the fan 16. It is clear that a free space from which air can be sucked in by the fan 18 must be present here between the upholstery (indicated in FIG. 1b) in the region of the panel surface of the backrest 10 and the inlet opening of the fan 18. A bulge-like widening 34 of the air duct 20 can be seen at the delivery side above the fan 18, the heating element 22 being accommodated inside said widening, as illustrated by broken lines. At the upper end of the air supply device 16, the L-shaped part 36, which comprises the air outlet opening 24, is designed as an element which can be upwardly displaced telescopically inside the air duct 20. By virtue of this arrangement, the L-shaped part 36 can be height-adjusted together with the head restraint 14. In the exemplary embodiment shown here, both the air duct 20 and the L-shaped part 36 are made of a plastic. The housing 38 of the fan 18 is at the same time connected in one piece to the air duct 20. The air duct 20 and the L-shaped part 36 have an approximately rectangular cross section substantially over their entire length.

Figure 3A:
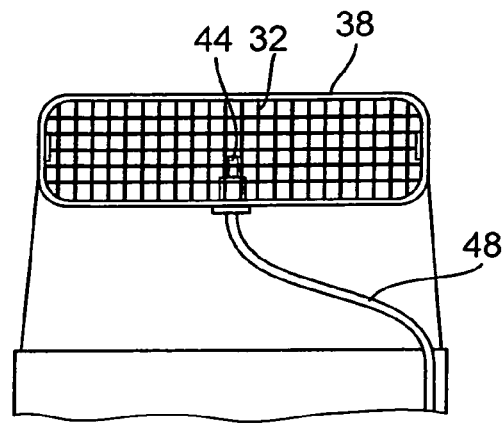
FIGS. 3a and 3b show a front view and a perspective view of the upper end of the air duct according to FIG. 2 with the air outlet opening, the sensor according to the invention being arranged close to the air outlet opening.
Figure 3B:
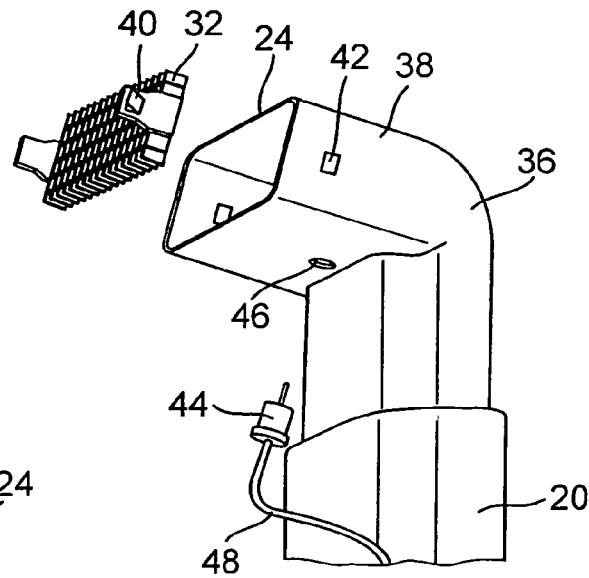

FIGS. 3a and 3b represent the upper part of the air duct 20 together with the L-shaped part 36 guided slideably therein in a perspective view and in a front view. It can be seen particularly from FIG. 3a that the upper part 38 of the L-shaped part 36 extends approximately horizontally. The grating element 32 is arranged inside this approximately horizontal duct part 38 close to the air outlet opening 24 and is arranged transversely with respect to the flow direction of the flow of air which flows through the air duct 20 or the upper duct part 38. In the exemplary embodiments shown, the grating element can be secured by means of latching tongues 40 to openings 42 in the L-shaped part 36. The flow of air produced by the fan 18 and subjected to turbulence as it flows through the heating element 20 is made more uniform by means of the grating element 32 arranged inside the air duct 20 or the duct part 38. Moreover, the grating element 32 has the effect that the flow of air which flows through is slightly banked up. As a result, the flow of air arrives at the seat occupant with somewhat lesser speed than without a grating element 32, a situation which has proved to be particularly advantageous in terms of the feeling of comfort experienced by said occupant. The banking-up of air at the grating element 32 additionally ensures that the flow of air remains somewhat longer in the air duct 20 and close to the heating element 22. The heating element 22 thus makes it possible to transmit more heat to the flow of air. A higher air outlet temperature in the region of the air outlet opening 24 thus results.

A sensor 44 for detecting a parameter value, which is arranged between the air outlet opening 24 and the heating element 22, is additionally provided inside the L-shaped part 36 of the air duct 20 of the air supply device 16. In the exemplary embodiment according to FIGS. 3a and 3b, the sensor 44 is designed as a temperature sensor and is fitted into a drilled hole 46 in the underside of the L-shaped part 36, the sensor 44 being arranged close behind the grating element 32. In this arrangement, the sensor 44 is connected via a lead 48 to a control device (not shown) of the air supply device 16, the lead 48 being dimensioned to be of such length that the height adjustment of the head restraint 14 and of the L-shaped part 36 is possible. The flow of air emerging from the air outlet opening 24 is controlled as a function of the parameter value of the sensor 44. If, for example, the temperature of the flow of air emerging from the air outlet opening 24 is too high, for example as a result of too high an ambient temperature, the heating element 22 and/or the fan 18 are/is switched back or off by means of the control device. In this arrangement, it is possible first to switch the heating element 22 down or off and only subsequently to switch the fan 18 down or off. When the temperature falls below a predetermined temperature, the fan 18 and the heating element 22 are switched on again or the air quantity or temperature is increased again. The value supplied by the sensor 44 additionally makes it possible to recognize if, for example, the air outlet opening 24 is partially or completely concealed in an inadmissible manner and the temperature of the flow of air consequently exceeds an admissible maximum value. In this case, the heating element 22 and/or the fan 18 are/is likewise switched back or off.

Figure 4A:
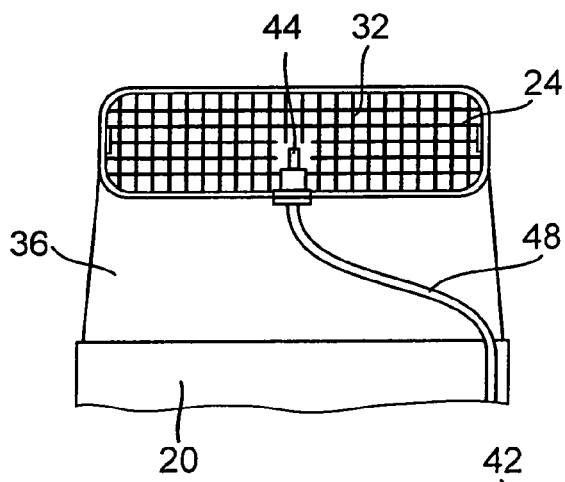
FIGS. 4a and 4b show a front view and a perspective view of the upper end of the air duct according to FIG. 2 according to a further embodiment of the invention, in which the sensor according to the invention is integrated into a grating element.
Figure 4B:
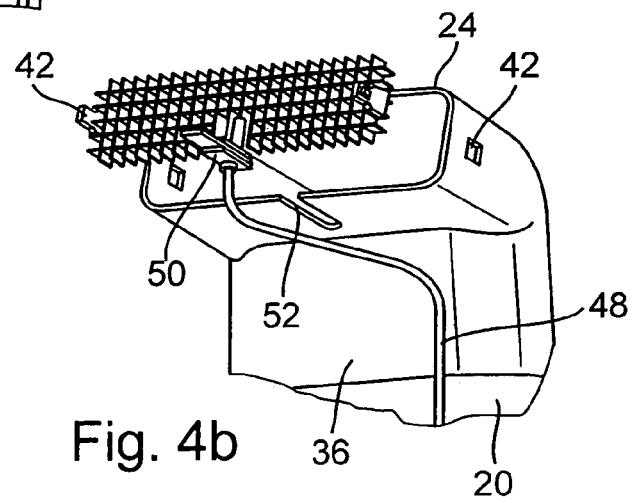

FIGS. 4a and 4b represent a further embodiment of the air supply device 16 in a schematic front view. In this instance, the sensor 44 is integrated into the grating element 32 and is borne by a socket part 50 which can be inserted from the front into a locating slot 52 at that end of the air duct 20 assigned to the air outlet opening 24. It is clear to see that the grating element 44 is correspondingly recessed in the region of the sensor 44.

The invention claimed is:

1. An air supply device for an automotive seat comprising:
   a fan at a lower end of the air supply device,
   an air duct, arranged above the fan at a delivery side of the fan, that has at least one air outlet opening provided in the upper region of the seat for supplying the head, shoulder and neck region of a seat occupant with a flow of air,
   a grating element that is securable within said air duct, adjacent to the air outlet opening, and removable from within said air duct,
   a heating element arranged in the air duct between the fan and the air outlet opening, and
   at least one sensor for detecting a parameter value as a function of which the flow of air emerging from the air outlet opening is controlled,
   wherein the air supply device is arranged inside a backrest of the automotive seat, and
   wherein the sensor is arranged inside a part of the air duct between the air outlet opening and the heating element that is height adjustable with a head restraint of the automotive seat with respect to another part of the air duct
   wherein the sensor is arranged close to said grating element, and wherein said grating element includes latching tongues in openings formed in air duct walls to secure the grating within the air duct.

2. The air supply device as claimed in claim 1, wherein the sensor is designed as a temperature sensor.

3. The air supply device as claimed in claim 1, wherein at least one of the heating element and the fan is controlled as a function of the parameter value detected by the sensor.

4. The air supply device as claimed in claim 1, wherein the sensor is integrated into the grating element.

5. The air supply device as claimed in claim 1, wherein the sensor is borne by a socket part which can be inserted into a locating slot at an end of the air duct assigned to the air outlet opening.

6. The air supply device as claimed in claim 1, wherein only the air outlet opening is visible from outside the backrest.

7. The air supply device as claimed in claim 1, wherein the grating element reduces turbulence of air passing through said air duct.

8. The air supply device as claimed in claim 1, wherein the grating element banks air up within said air duct to reduce velocity of air exiting the air duct
   wherein the sensor is arranged close to said grating element, and wherein said grating element includes latching tongues in openings formed in air duct walls to secure the grating within the air duct.

* * * * *